C. T. WEEKS.
DIRIGIBLE HEADLIGHT FOR AUTOMOBILES.
APPLICATION FILED APR. 4, 1914.
1,131,023.
Patented Mar. 9, 1915.
2 SHEETS—SHEET 1.
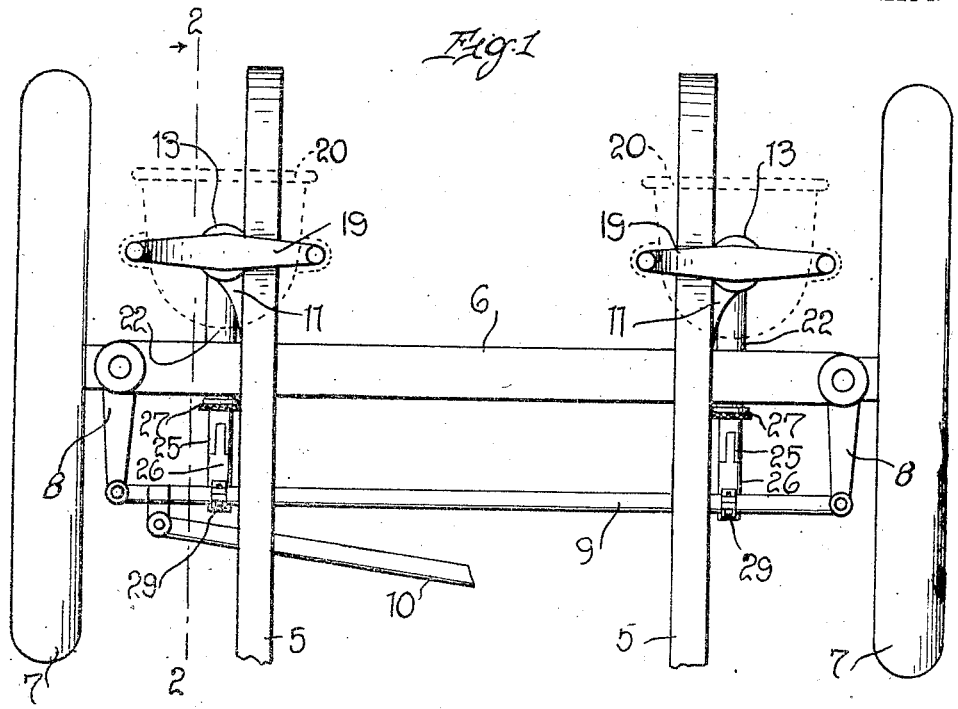
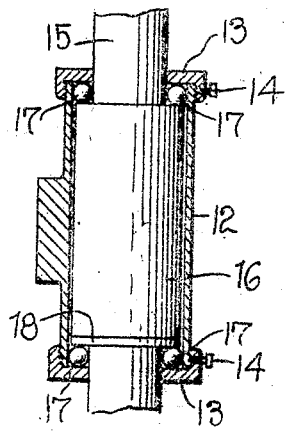
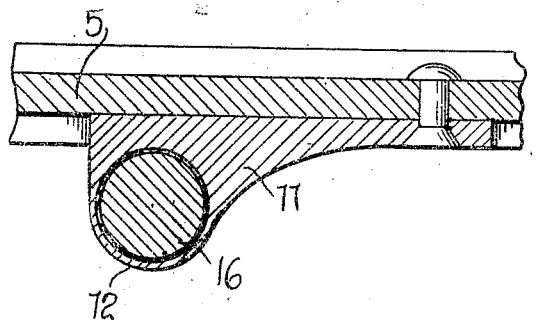
Witnesses
Inventor
C. T. WEEKS
By Watson E. Coleman
Attorney C. T. WEEKS.
DIRIGIBLE HEADLIGHT FOR AUTOMOBILES.
APPLICATION FILED APR. 4, 1914.

1,131,023.

Patented Mar. 9, 1915.
2 SHEETS—SHEET 2.

Witnesses

Inventor
C. T. WEEKS
By Watson E. Coleman
Attorney

UNITED STATES PATENT OFFICE.

CHARLES T. WEEKS, OF CHELSEA, MASSACHUSETTS.

DIRIGIBLE HEADLIGHT FOR AUTOMOBILES.

1,131,023.  Specification of Letters Patent.  Patented Mar. 9, 1915.

Application filed April 4, 1914. Serial No. 829,622.

*To all whom it may concern:*

Be it known that I, CHARLES T. WEEKS, a citizen of the United States, residing at Chelsea, in the county of Suffolk and State of Massachusetts, have invented certain new and useful Improvements in Dirigible Headlights for Automobiles, of which the following is a specification, reference being had to the accompanying drawings.

This invention relates to dirigible head lights for automobiles and has for its primary object to provide a device of this character applicable to mechanically or electrically propelled vehicles now in general use whereby the rays from the head lights or lamps are directed to illuminate the roadway in advance of the vehicle wheels when turning a corner, so as to avoid accidents which might otherwise occur owing to an improper or insufficient illumination of the road.

My invention has for another object to provide a device of the above character which consists of a number of parts so mounted and arranged as to relieve the same of excessive strains due to the vertical action of the springs which support the chassis or frame of the vehicle body.

The invention has for a further object to provide simple, strong and durable mechanism automatically actuated from the steering rod of the vehicle, which is highly efficient and reliable in practical operation and may be produced at comparatively small cost.

With the above and other objects in view as will become apparent as the description proceeds, the invention consists in certain constructions, combinations and arrangements of the parts that I shall hereinafter fully describe and claim.

For a full understanding of the invention, reference is to be had to the following description and accompanying drawings, in which—

Figure 2:
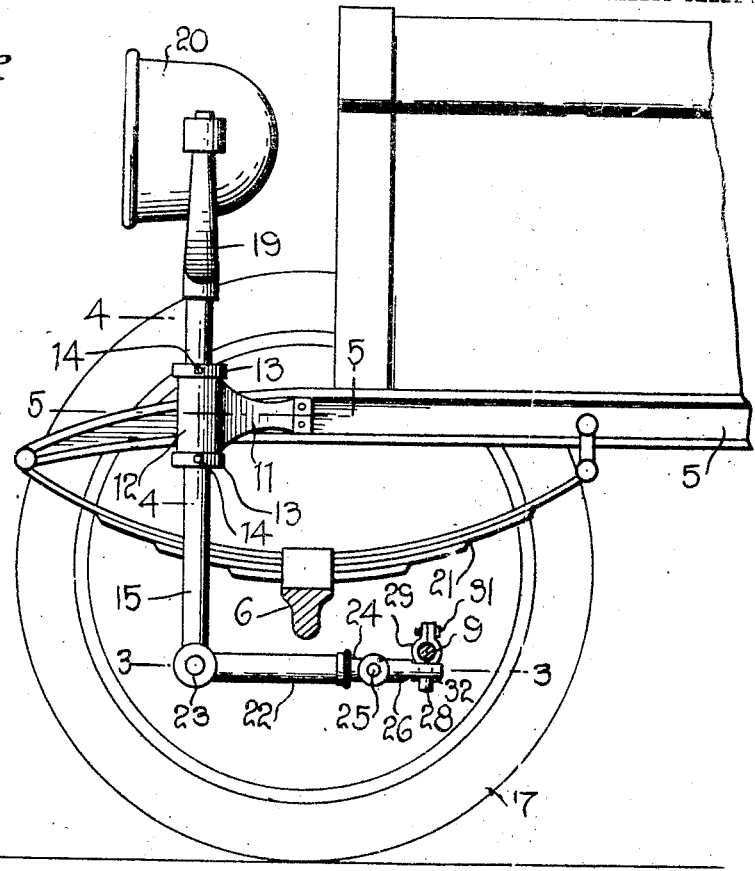
Figure 3:
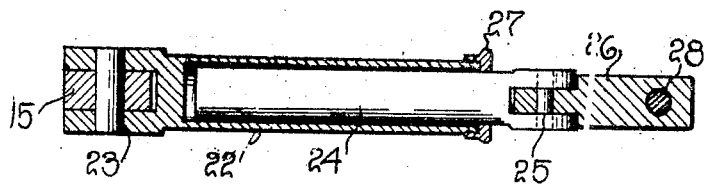

Figure 1 is a top plan view of the front portion of the frame or chassis of an automobile illustrating my invention in its preferred embodiment applied thereto; Fig. 2 is a section taken on the line 2—2 of Fig. 1; Fig. 3 is a section taken on the line 3—3 of Fig. 2; Fig. 4 is a detail vertical section on the line 4—4 of Fig. 2 illustrating the mounting of the lamp rod; Fig. 5 is a section taken on the line 5—5 of Fig. 2.

Referring in detail to the drawings, 5 designates the longitudinal side bars of the frame or chassis of an automobile or like motor propelled vehicle. The wheel axle 6 is mounted upon the frame of the machine in any ordinary or approved manner, and is provided at its ends with the usual knuckles upon which the supporting wheels indicated at 7 are mounted. Arms 8 project from the wheel knuckles and are connected by the rod 9. A rod 10 is connected to this transverse rod 9 and to the steering mechanism which may be of any conventional type.

The side bars 5 of the frame are of channel form in cross section and to the outer sides of said bars adjacent their forward ends, the brackets 11 are bolted or otherwise securely fixed. Each of these brackets has integrally formed upon its forward end a vertically disposed sleeve or casing 12, the upper and lower ends of which are exteriorly threaded to receive the caps 13, said caps being held against casual turning movement upon the ends of the sleeves by means of suitable set screws indicated at 14.

15 designates the lamp rod which is provided intermediate of its ends with an enlarged portion 16 housed within the sleeve 12. The cap members 13 are provided with openings through which the lamp rod is loosely disposed.

17 designates an annular series of bearing balls arranged between the inner faces of the respective caps 13 and the opposed ends of the enlarged portion 16 of the lamp supporting rods. A steel washer plate 18 is preferably arranged upon the lamp rod between the lower end of the enlargement 16 and the bearing balls 17, and prevents excessive friction against the enlargement of the lamp rod.

The lamp rods 15 are provided upon their upper ends with the usual yokes 19 in which the lamps indicated at 20 are mounted. The rods 15 project a considerable distance below the frame supporting springs shown at 21, and to the lower end of each of said rods, a rearwardly projecting tube or sleeve 22 is connected by means of a horizontal pivot 23. A rod 24 is loosely disposed in this sleeve for longitudinal sliding movement and the outer end thereof is connected by means of a horizontal pivot 25 to the rod section 26.

A cap 27 is preferably threaded upon the end of the sleeve or tube 22 and closely surrounds the rod 24 to prevent the entrance of foreign matter to the interior of the tube and eliminate excessive friction upon the walls of said tube in the sliding movement of the rod therein. The other end of the rod section 26 is provided with an opening to loosely receive a stud pin 28 which is formed upon a collar 29. This collar is split as indicated at 30 and the opposed portions thereof are adapted for clamping engagement upon the rod 9. The ends of the collar sections are adapted to receive a bolt 31 whereby the collar may be securely clamped upon the rod. The stud pin 28 is held in connection with the rod section 26 by means of the cotter pin indicated at 32.

From the foregoing description taken in connection with the accompanying drawings, the construction and manner of operation of my invention will be clearly understood. When the connecting rod 9 is shifted transversely in the actuation of the steering mechanism to turn the wheels upon the ends of the axle, it will be obvious that through the medium of the slidably engaged tubes 22 and rods 24, the lamp supporting rods 15 are also rotated in their respective bearing brackets so that the lamps or head lights on the upper ends of said rods are disposed at the same angle with respect to the longitudinal axis of the machine as are the steering wheels, thus at all times diffusing the light rays directly in front of the vehicle wheels upon the road surface. In the ordinary vehicle of this character, wherein the lamps are stationary, the light rays, when the machine turns a corner are projected to one side of the roadway and not directly in front of the vehicle. It will be obvious that by means of my improved dirigible head lights, collisions with pedestrians or other vehicles may be avoided and serious accidents thus reduced to a minimum. Owing to the provision of the horizonally disposed pivots 23 and 25 connecting the lower ends of the lamp rods to the rod 9, the tube 22 and rod 24 may move in a vertical plane with respect to the rod section 26, when the vehicle body moves vertically upon the supporting springs 21 in passing over rough or uneven road surfaces. Considerable strain to the several parts is thus avoided and the durability and operating efficiency of the device as a whole greatly prolonged.

While I have shown and described the preferred construction and arrangement of the several elements employed, it will be understood that the invention is susceptible of considerable modification in the form, proportion and arrangement of the various parts and I therefore reserve the privilege of resorting to all such legitimate changes as may be fairly embodied within the spirit and scope of the invention as claimed.

Having thus described the invention, what is claimed is:

The combination with a revoluble lamp support, and a transversely shiftable steering rod, of a tube pivotally connected with the lamp support, a cap threaded upon the free end of the tube and provided with an opening, a rod slidably arranged within the tube, a vertically and horizontally movable rod pivotally connected with the first named rod, and a stud carried by the steering rod loosely engaging the free end of said rod.

In testimony whereof I hereunto affix my signature in the presence of two witnesses.

CHARLES T. WEEKS.

Witnesses:
FRANCIS H. CURRY,
ALWAR B. McKINNA.